United States Patent [19]

Harford

[11] 4,254,436

[45] Mar. 3, 1981

[54] NOISE CANCELLATION CIRCUIT

[75] Inventor: Jack R. Harford, Flemington, N.J.

[73] Assignee: RCA Corporation, New York, N.Y.

[21] Appl. No.: 934,829

[22] Filed: Aug. 18, 1978

[51] Int. Cl.³ .......................... H04N 5/08; H04N 5/21
[52] U.S. Cl. ..................................... 358/157; 358/167
[58] Field of Search ................. 358/36, 157, 167, 177, 358/156; 328/139

[56] References Cited

U.S. PATENT DOCUMENTS

| | | | |
|---|---|---|---|
| 3,624,288 | 11/1971 | Hofmann | 358/157 |
| 3,860,750 | 1/1975 | Ueda | 358/156 |
| 3,979,683 | 9/1976 | Ikeda | 358/177 |
| 4,042,959 | 8/1977 | Klein | 358/167 |

OTHER PUBLICATIONS

1977 RCA Linear Integrated Circuit Databook, pp. 355–358.
"RC Filter Design by the Numbers", *The Electronic Engineer*, vol. 27, No. 10, Oct. 1968, pp. 57–64.

*Primary Examiner*—John C. Martin
*Attorney, Agent, or Firm*—Eugene M. Whitacre; William H. Meagher; W. Brinton Yorks, Jr.

[57] ABSTRACT

A noise cancellation circuit is provided for cancelling impulse noise in a composite video signal. A composite video signal which may be contaminated with impulse noise is coupled to a noise inverter and an active filter. The noise inverter generates an inverted noise pulse for each noise pulse in the composite video signal which exceeds a predetermined threshold level. The active filter delays the composite video signal and combines the delayed video signal with the inverted noise pulses, resulting in cancellation of the impulse noise. The noise-free video signal is amplified by the active filter for subsequent signal processing. The threshold level of the noise inverter varies in response to the signal level at the output of the active filter. The active filter utilizes a feedback capacitor to delay the video signal and to improve the transition time of the leading edges of synchronizing signal components of the video signal. The feedback capacitor may be constructed from N+P+ semiconductor material, which is especially advantageous in integrated circuit manufacture.

9 Claims, 14 Drawing Figures

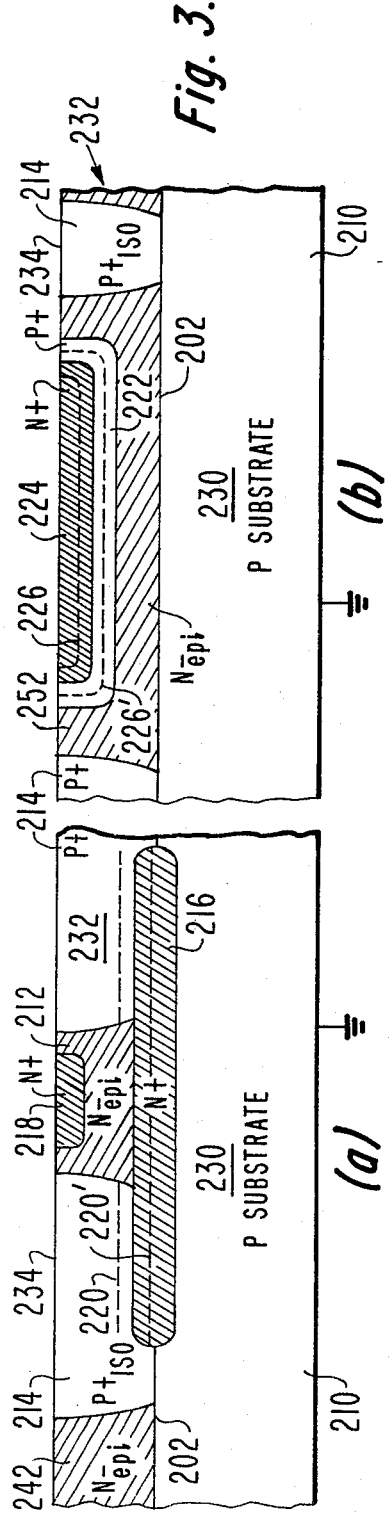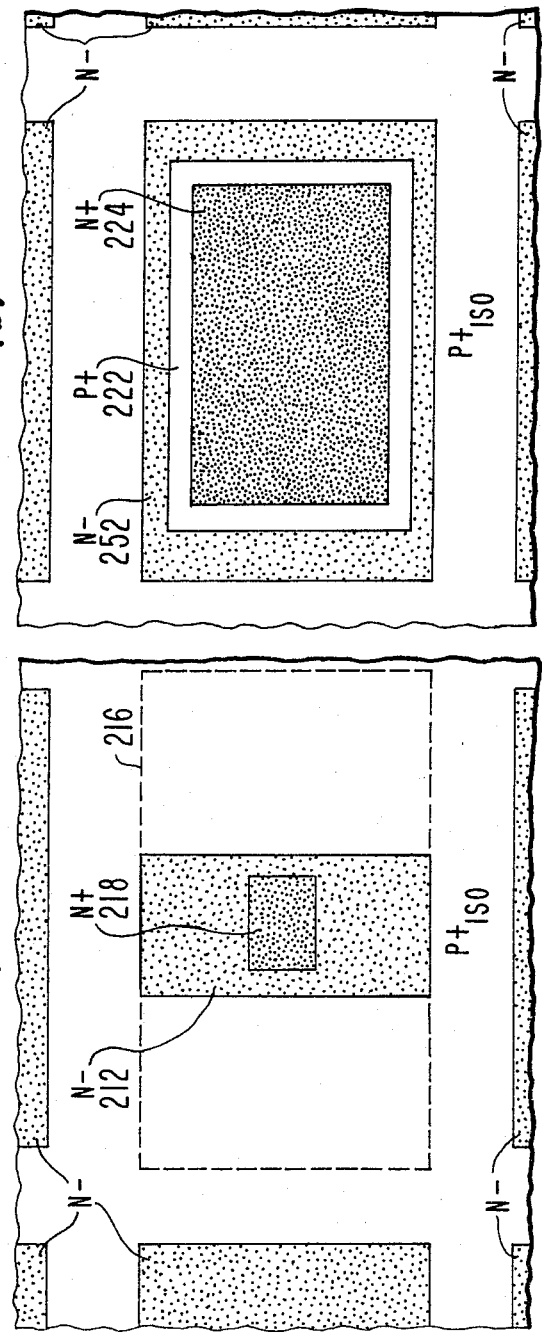
Fig. 3.
Fig. 4.

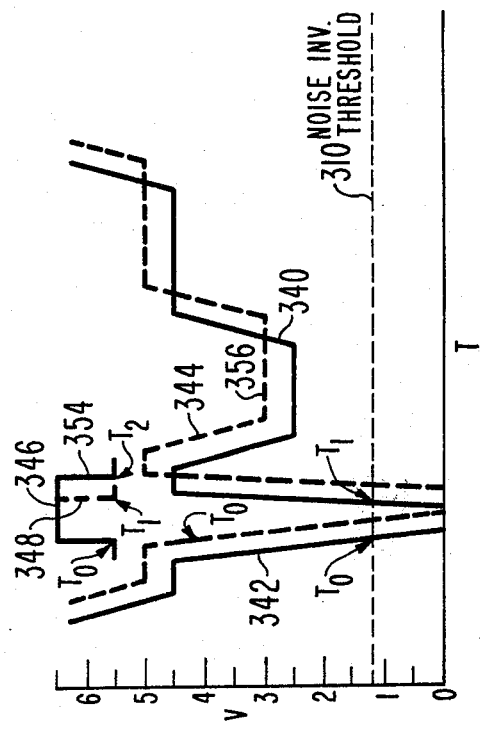
Fig. 5.
Fig. 6.
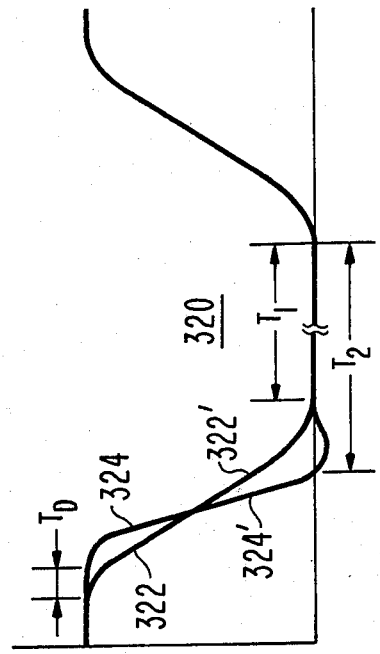
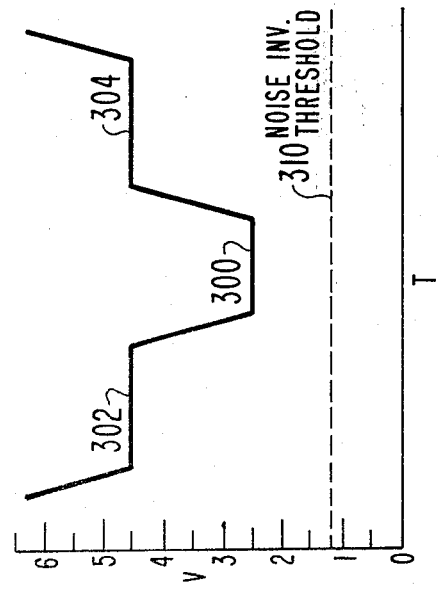
Fig. 7.
Fig. 8.
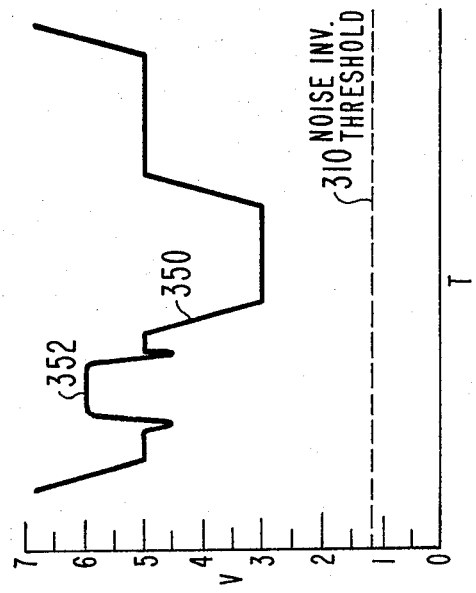

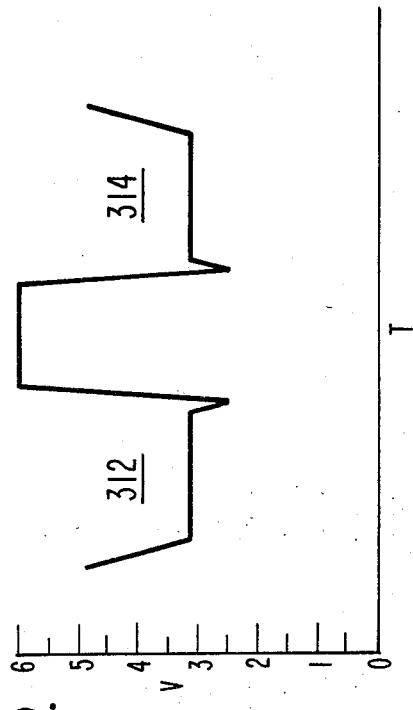
Fig. 10.
Fig. 9.
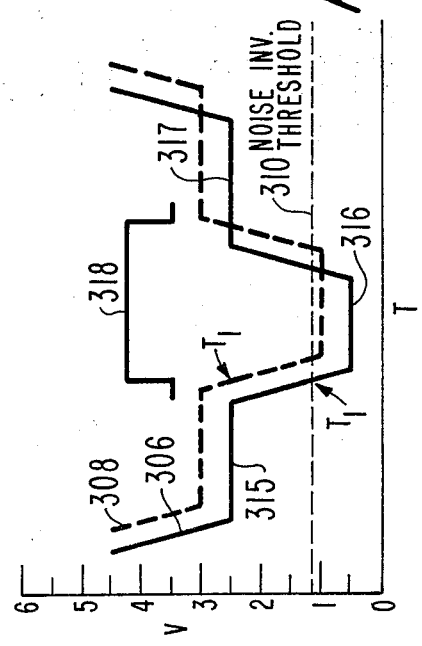
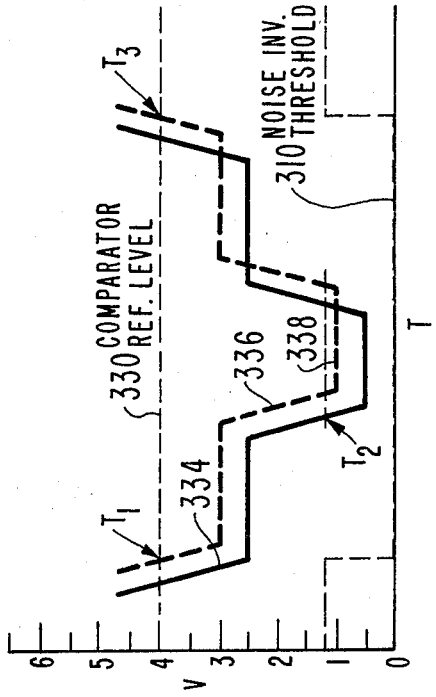
Fig. 12.
Fig. 11.
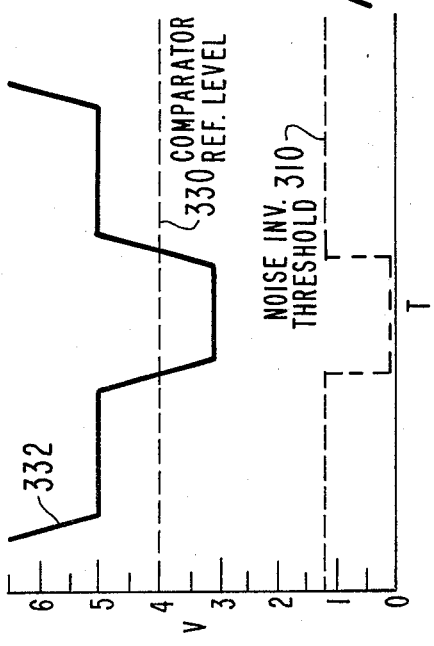

NOISE CANCELLATION CIRCUIT

This invention relates to noise cancellation circuits, and more particularly to the combination of a noise inverter and an active filter which will cancel impulse noise in a composite video signal while maintaining the risetimes of synchronizing signal components of a composite video signal. The noise inverter theshold varies in response to changes in the level of the noise-cancelled video signal. The use of the novel active filter provides significant cost and performance advantages when the circuit is implemented in integrated circuit form.

In accordance with television transmission standards, the composite video signal includes periodically recurring horizontal and vertical synchronizing pulses for synchronizing the scanning circuits associated with the kinescope in a television receiver and the scanning circuits associated with the image pick-up device at the television transmitting station. In the composite video signal, the horizontal and vertical synchronizing pulses all are of substantially the same amplitude with respect to a reference level, the reference level being defined in terms of a particular brightness condition (e.g., an arbitrary black level) in the televised image. Television receivers include a synchronizing signal separator circuit capable of differentiating between the reference or black level of the video signal and the tips of the synchronizing pulses so as to strip off or respond only to signals in a range commencing at or near the reference black level and including the sync pulses. Frequently, unwanted impulse noise is present in the composite video signal and such noise may extend to a level beyond the sync pulse tips. Impulse noise of such magnitude may cause spurious operation of the synchronizing circuits and/or may produce a condition in the sync separator circuit known as "impulse noise set-up".

Prior art sync separator circuits have commonly included noise protection circuits to inhibit noise set-up of the sync separator. A typical noise protection circuit will clip impulse noise at a level just above the sync tip level. While this technique effectively removes large amplitude noise pulses from the composite video signal, it nevertheless couples clipped noise pulses to the sync separator, which may be incorrectly interpreted as sync pulses.

An improved noise protection circuit comprises a noise inverting circuit which inverts impulse noise in the composite video signal. Such noise inverting circuits utilize either a D.C. threshold or an A.C. threshold for the detection of impulse noise and the generation of inverted noise pulses. The inverted noise pulses are additively combined with the composite video signal to cancel the impulse noise. To ensure cancellation of the leading edges of the impulse noise, it is desirable to delay the video signal before it is combined with the inverted noise pulses. It is also desirable to stretch the inverted noise pulses so that the trailing edges of the impulse noise are cancelled. However, delaying the video signal can result in a narrowing of the bandwidth-reduced sync pulses in the composite video signal, which can appreciably reduce the pulse width of the sync pulses. Too much delay of the video signal will present an unacceptable band-reduced signal at the input to the sync separator, which will then generate sync pulses having less than nominal pulse widths.

In accordance with the present invention, a D.C. threshold noise inverter is used to invert impulse noise in the composite video signal which exceeds a predetermined threshold level. A D.C. threshold noise inverter is used because A.C. threshold circuits have detection thresholds which undesirably increase when subjected to bursts of high energy noise. Moreover, A.C. threshold circuits utilize R-C components which do not readily lend themselves to integrated circuit construction.

The composite video signal is also coupled to an active filter, which delays the video signal and combines it with the inverted noise pulses produced by the noise inverter, thereby producing a noise cancelled composite video signal at the output of the filter. The filter includes feedback means to improve the transition time of the leading edges of the synchronizing signal components, thereby ensuring that sync and equalizing pulses of adequate duration are available for detection and separation by the sync separator, and minimizing phase modulation of the separated sync signal due to video signal amplitude variations caused by airplane flutter. The active filter also cooperates with the noise inverter to effectively stretch the inverted noise pulses to ensure cancellation of the trailing edges of impulse noise.

The use of a D.C. threshold noise inverter can result in an erroneous operating condition known as "sidelock." This condition can occur when the amplitude of the composite video signal increases so that the tips of the sync pulses exceed the threshold of the noise inverter. The sync pulses wil then be interpreted as noise pulses by the noise inverter, which will invert them, thereby cancelling the sync pulses at the output of the active filter. In the case of the horizontal sync pulses, the resultant composite video signal will appear to have a sync pulse on either side of the cancelled horizontal sync pulse at the front and back porches of the horizontal sync interval. These two false sync pulses will be separated by the sync separator and coupled to a phase-locked loop with the horizontal oscillator signal, which will lock up on one of the pulses.

One solution to the sidelock problem would be to reduce the amplitude of the composite video signal, thereby minimizing the possibility that the sync tips would reach the noise inverter threshold. However, reducing the video level will degrade the signal-to-noise ratio and impulse noise immunity. A second solution would be to increase the speed of the AGC system, so that the AGC circuit would return the video signal to a lower level during the vertical interval when the broad vertical pulses are sampled by the AGC circuit. Increasing the speed of the AGC system, however, will increase the susceptibility of the AGC circuit to generating an AGC control voltage in response to impulse noise in the video signal, a condition known as "AGC noise set-up."

In accordance with another aspect of the present invention, the sidelock condition is prevented by varying the D.C. threshold level of the noise inverter in response to the level of the video signal at the output of the active filter. A comparator senses the level of the delayed, noise-cancelled video signal and disables the noise inverter by changing its D.C. threshold whenever the video signal level approaches the noise inverter threshold. When the video signal is at normal signal levels, the noise inverter remains enabled so that impulse noise in the video signal is cancelled at the output of the active filter.

The noise inverter and active filter of the present invention readily lend themselves to implementation in integrated circuit form. The D.C. threshold noise inverter may be constructed entirely of transistors, resistors, and diodes, requiring no capacitive elements. The active filter requires two capacitors; however, the values of these elements permit their construction using junction capacitances of semiconductor material on an integrated circuit chip. Moreover, the feedback capacitor is coupled so that it requires a low breakdown potential, permitting its construction from an N+P+ semiconductor junction. An N+P+ capacitor has advantages of high capacitance per unit area on the integrated circuit chip, as well as an ability to be manufactured to tighter capacitance value tolerances. The feedback capacitor acts as a lowpass filter element upon reception of impulse noise by the active filter, and improves the transition time of the leading edges of sync pulses in the video signal through its feedback capabilities.

Figure 1:
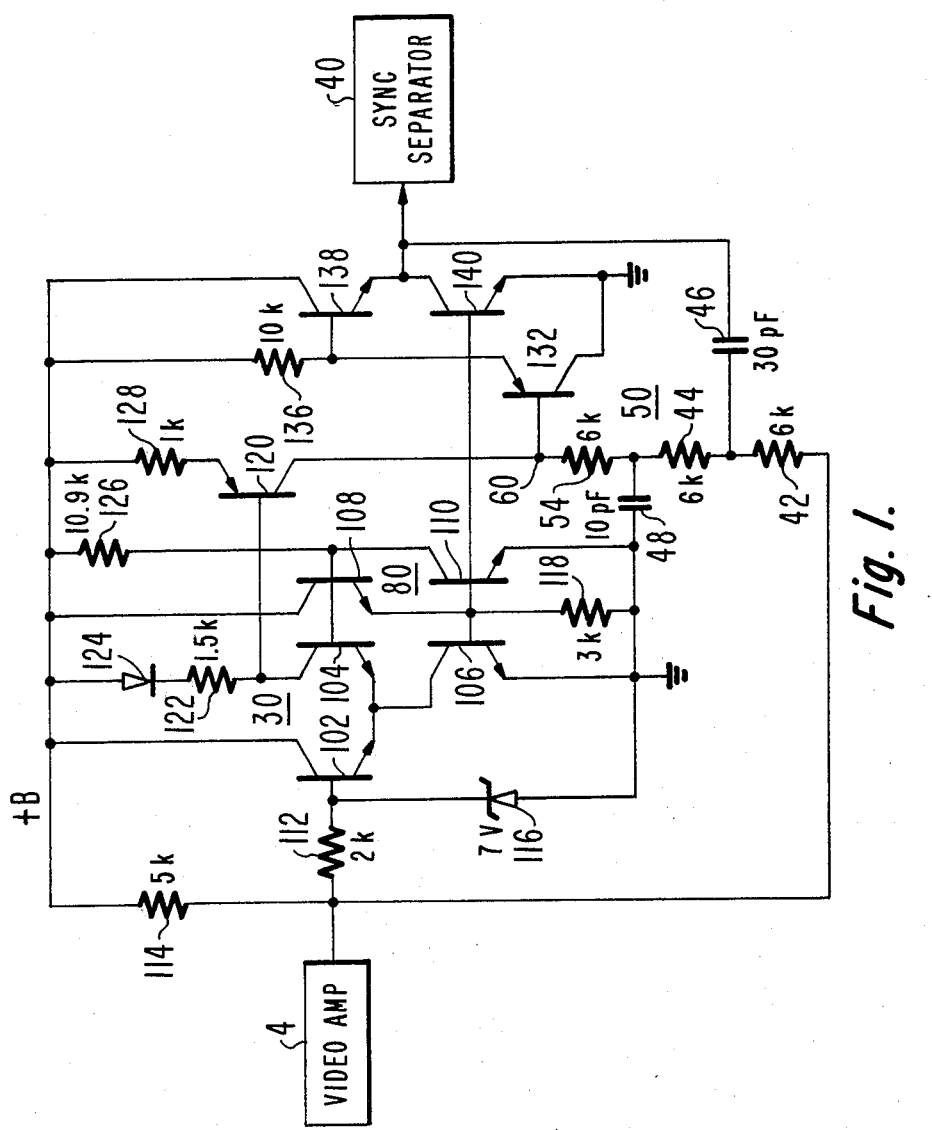
FIG. 1 illustrates, partially in block diagram form and partially in schematic diagram form, a noise cancellation circuit constructed in accordance with the principles of the present invention.
Figure 2:
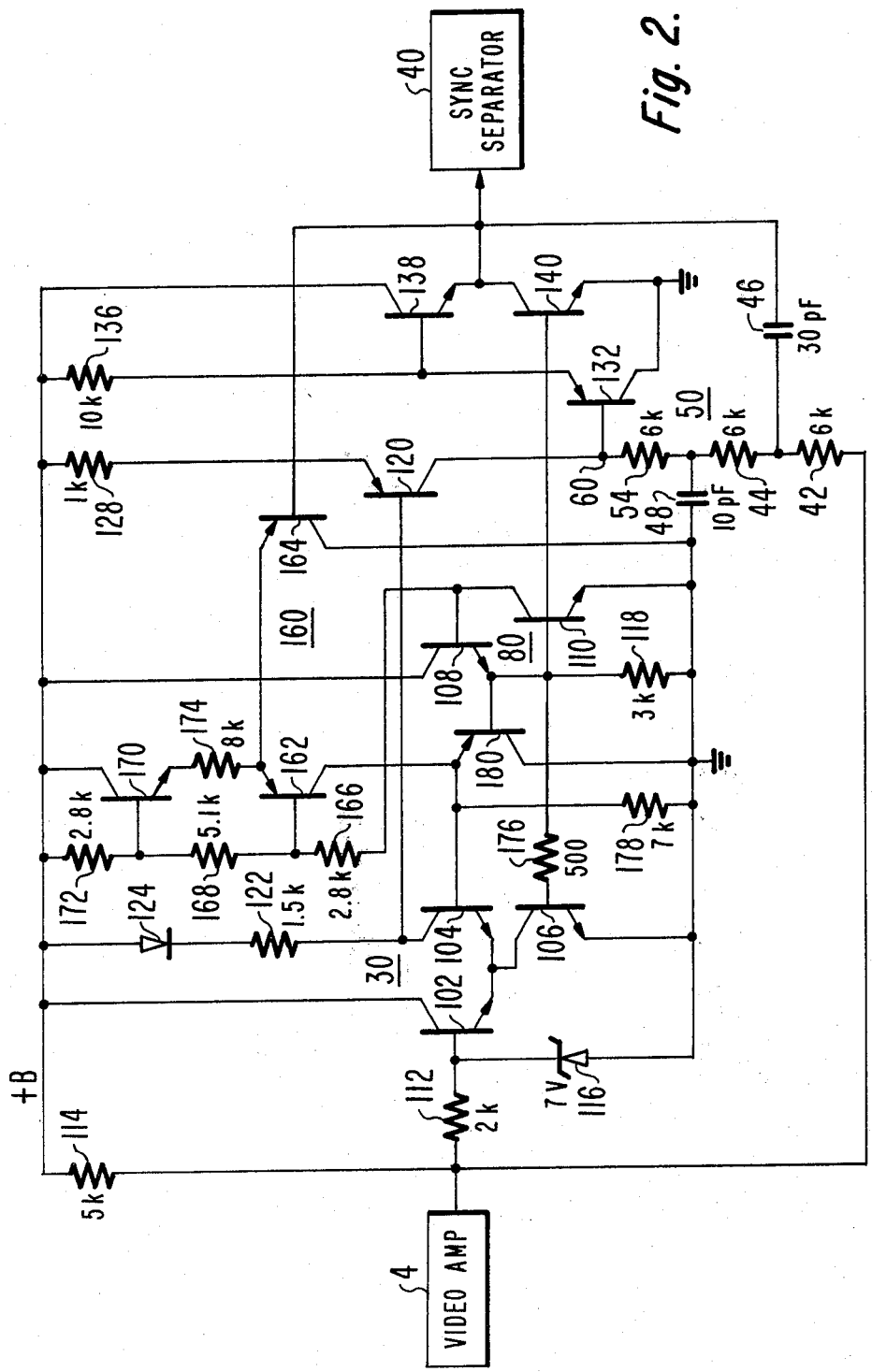
FIG. 2 illustrates, partially in block diagram form and partially in schematic diagram form, an embodiment of the present invention which prevents the sidelock condition.

FIGS. 3(a) and 3(b) are cross-sectional representations of a monolithic integrated circuit chip containing the two capacitors of the active filter of the present invention;

FIGS. 4(a) and 4(b) are plan views of the monolithic integrated circuit chip capacitors of FIGS. 3(a) and 3(b);

FIG. 5 illustrates a horizontal synchronizing signal waveform at the input of the noise cancellation circuit of FIG. 1;

FIGS. 6 and 7 are waveforms illustrating the cancellation of noise by the embodiments of the present invention shown in FIGS. 1 and 2;

FIG. 8 illustrates a bandwidth-modified sync pulse produced by the active filter of the present invention;

FIGS. 9 and 10 illustrate waveforms which may result in a sidelock condition; and FIGS. 11 and 12 illustrate waveforms depicting the operation of the embodiment of FIG. 2.

Referring to FIG. 1, a negative-going composite video signal is coupled to a noise inverter 30 and an active filter 50 from a video amplifier 4. A resistor 114 supplies bias potential from a source of supply voltage (+B) to the inputs of noise inverter 30 and active filter 50. The video signal is coupled to the base of a noise inverter transistor 102 by a resistor 112. Noise inverter transistors 102 and 104 comprise a differential amplifier which detects noise pulses in the video signal. The base of transistor 102 is protected against over-voltage conditions by a zener diode 116. The cathode of zener diode 116 is coupled to the junction of resistor 112 and the base of transistor 102 and the anode is coupled to a source of reference potential (ground). The collector of transistor 102 is coupled to the +B supply and the emitter of transistor 102 is coupled to the emitter of transistor 104 and the collector of a transistor 106. A source of constant current for the differential amplifier is supplied by transistor 106, which has its emitter electrode coupled to ground and its base electrode coupled to a $V_{be}$ supply 80.

$V_{be}$ supply 80 is comprised of transistors 108 and 110 and resistors 118 and 126 and supplies $V_{be}$ voltages to noise inverter 30 and the active filter 50. Transistor 110 has its emitter electrode coupled to ground and its collector electrode coupled to the base of transistor 108 and to the +B by resistor 126. Transistor 108 has its collector electrode coupled to the +B supply and its emitter electrode coupled to the base of transistor 110 and to ground by resistor 118. In this configuration, a one $V_{be}$ voltage (approximately 650 millivolts) is supplied at the base of transistor 110 and a 2 $V_{be}$ voltage (approximately 1.3 volts) is supplied at the base of transistor 108. $V_{be}$ supply 80 provides a one $V_{be}$ voltage to the bases of current source transistors 106 and 140 and a 2 $V_{be}$ reference voltage to the noise inverter differential amplifier at the base of transistor 104.

The collector electrode of differential amplifier transistor 104 is coupled to the base of a transistor 120 and to a bias resistor 122. Resistor 122 is coupled to the cathode of a diode 124, which has its anode coupled to the +B supply. Diode 124 acts to limit the base voltage of transistor 120 to a level which is at least one $V_{be}$ below the level of the +B supply.

Transistor 120 is a PNP transistor which has its emitter electrode coupled to the +B supply by a resistor 128. Inverted noise pulses are produced at the collector of transistor 120 and coupled to the junction of a resistor 54 and the base of a transistor 132 at a connection point 60.

The composite video signal is also coupled from video amplifier 4 to connection point 60 by way of resistors 42, a low pass filter comprises of resistors 44 and capacitor 48 and resistor 54 of active filter 50. Capacitor 48 is coupled to ground from the junction of resistors 44 and 50.

Follower transistor 132 translates the voltage level of the composite video signal which is applied to its base electrode at connection point 60. The collector electrode of transistor 132 is coupled to ground and its emitter electrode is coupled to the base of follower transistor 138. Supply current for transistor 132 and bias current for transistor 138 is provided by a resistor 136, which is coupled between the +B supply and the junction of the emitter of transistor 132 and the base of transistor 138.

Follower transistor 138 has its collector electrode coupled to the +B supply and its emitter electrode coupled to a sync separator 40, the collector of a transistor 140 and a feedback capacitor 46. Current source transistor 140 has its emitter electrode coupled to ground and its base electrode coupled to the one $V_{be}$ supply point of $V_{be}$ supply 80 and provides a source of constant current to the emitter of transistor 138. Capacitor 46 feeds the signal produced at the emitter of transistor 138 back to the input video signal path of active filter 50 at the junction of resistors 42 and 44.

In normal operation, video amplifier 4 couples a negative-going composite video signal to resistors 112 of the noise inverter 30. The composite video signal contains synchronizing signal components, as illustrated by the horizontal sync pulse 300 shown in FIG. 5. The tip of the sync pulse 300 is nominally at a 2.5 volt level and the sync pulse appears on a video black-level pedestal which is at 4.5 volts. The horizontal sync pulse pedestal is comprised of a front porch 302 which precedes the sync pulse, and a back porch 304 which follows the sync pulse. The composite video signal is coupled to the base of differential amplifier transistor 102 in FIG. 1, where it is compared with a 1.3 volt reference level which is coupled to the base of differential amplifier transistor 104 from $V_{be}$ supply 80. This noise inverter threshold level is shown as a broken line 310 in FIG. 5.

Concurrent with its application at the input of the noise inverter 30, the composite video signal is applied to active filter 50, where it is delayed by low pass filters comprising resistor 42 and capacitor 46, and resistor 44 and capacitor 48. The delayed video signal is coupled to the output of the noise inverter 30 at connection point 60.

The composite video signal may contain undesirable impulse noise, as illustrated by solid waveform 340 in FIG. 6. The delayed video signal which is coupled to connection point 60 by the active filter 50 is shown by broken line 344 in FIG. 6. When noise pulse 342 in the video signal exceeds the noise inverter threshold 310, transistor 102 begins to come out of conduction and transistor 104 starts to conduct. Conduction by transistor 104 causes PNP transistor 120 to conduct, thereby generating a positive-going, inverted noise pulse 346 at the collector of transistor 120 and at connection point 60.

As FIG. 6 illustrates, at the time $T_0$ that the noise pulse 342 crosses the noise inverter threshold 310, the same noise pulse in the delayed video signal 344 at connection point 60 has only reached an amplitude of approximately 0.5 volts below the pedestal level of the video signal. Thus, the leading edge of the noise pulse at connection point 60 will be cancelled before the pulse reaches the sync tip level 356 of the video signal. By cancelling the noise pulse before it reaches the sync tip level, and coupling of noise pulses which might otherwise be interpreted as sync pulses by sync separator 40 is prevented.

Transistor 104 in the noise inverter 30 continues to conduct until the noise pulse 342 crosses the noise inverter threshold at time $T_1$. While this transition would normally be expected to terminate inverted noise pulse 346 at time $T_1$ as shown by broken line 348 in FIG. 6, active filter capacitors 46 and 48, which have been charged by current from transistor 120, must be discharged in order to terminate the inverted noise pulse 346. Thus, inverted noise pulse 346 ends at a later time $T_2$, as indicated by solid line 354, after capacitors 46 and 48 have discharged through resistor 42. In this way, the inverted noise pulse 346 produced by transistor 120 is effectively "stretched", so that is has a duration which encompasses the trailing edge of the noise pulse of the delayed video signal 344. The result is that the stretched, inverted noise pulse 346 cancels both the leading and trailing edges of the noise pulse in the delayed video signal 344 at connection point 60.

The amplified, noise cancelled video signal which is coupled to sync separator 40 from the emitter of transistor 138 is shown in FIG. 7. It is seen that that portion of noise pulse 342 which would otherwise exceed the sync tip level has been cancelled to approximately a 6 volt level, as illustrated by waveform 352. Only small slivers of the leading and trailing edges of the noise pulse remain, neither of which approach the sync tip amplitude of sync pulse 350.

When the noise-free video signal of FIG. 5 is coupled to the noise inverter 30 and the active filter 50, the noise inverter does not operate, since the signal does not exceed the noise inverter threshold. The active filter 50 will, however, act to delay the video signal, as illustrated in FIG. 8, which shows a sync pulse 320, have two leading edges. Leading edge 322—322' represents a sync pulse delayed by the lowpass filter comprising resistor 44 and capacitor 48 alone, and leading edge 324—324' represents the same waveform when the effect of feedback capacitor 46 is considered.

When the sync pulse is initially applied to the active filter 50, resistor 42 and capacitor 46 act as a lowpass filter to delay the leading edge 322 of the pulse an additional amount, $T_D$, as shown by leading edge 324 in FIG. 8. As the leading edge begins to drop toward sync tip level, the signal is coupled by lowpass filter 44, 48 and resistor 54 to transistor 132 and transistor 138, where a low impedance output signal is produced at the emitter of transistor 138. The low impedance output signal is coupled back to the video signal input of active filter 50 by feedback capacitor 46, which no longer acts as a lowpass filter capacitor, but now reinforces the input pulse as a feedback capacitor. The signal which is fed back to the junction of resistors 42 and 44 acts to decrease the time required for the leading edge to reach the sync tip level, as shown by waveform 324'. The sync pulse is therefore at the sync tip level for a duration $T_2$, which is longer than the sync tip duration $T_1$ produced by the lowpass filter 44, 48 acting alone. The duration of the sync tip is important when using a peak detecting sync separator, such as that described in copending U.S. patent application Ser. No. 934,821, entitled "Synchronization Signal Separator Circuit," now U.S. Pat. No. 4,185,299, filed concurrently herewith, since the sync tip duration in large measure determines the widths of the separated sync pulses. The sync pulse widths must be maintained to ensure accurate operation of succeeding signal processing circuitry, such as the vertical integrator in the vertical deflection system, which provides timing signals for proper picture interlace. Moreover, variations in sync pulse width can cause the sync separator circuit to produce undesirably phase-shifted sync pulses when the video signal fluctuates in amplitude due to airplane flutter.

While a feedback signal is available at the emitter of transistor 132, it was found that this signal had an unacceptably reduced (5 MHz) bandwidth due to the high output impedance of transistor 132 at high frequencies. Transistors 138 and 140 are included in the active filter 50 to provide a broad bandwidth signal at the emitter of transistor 138, the output of the active filter 50. Transistor 140 maintains a low impedance at the output of the active filter 50, preventing any coupling of the noise-contaminated video signal through the feedback capacitor 46 from the input of the active filter 50 (the junction of resistors 42 and 44).

The coupling of feedback capacitor 46 between the output and input signal paths of the active filter 50 provides special advantages when the circuit is implemented in integrated circuit form. Since capacitor 46 is coupled between two signal points which experience virtually identical voltage variation with changes in signal level, capacitor 46 may be constructed on an integrated circuit chip utilizing low voltage, high capacitance N+P+ semiconductor material. By comparison, since capacitor 48 is coupled between the signal path and ground, it must be able to withstand the maximum video signal level (8–10 volts, relative to ground) without breaking down, and hence must be constructed as a less efficient "pocket" capacitor.

Referring to FIG. 3(a), a cross-sectional view of a typical integrated circuit pocket capacitor is shown. The integrated circuit device includes a body 210 of semiconductor material, usually silicon, including a substrate 230 of one type conductivity and an epitaxial layer 232 of opposite type conductivity with an interface 202 therebetween. In usual practice, and in this example, the substrate 230 is of P type conductivity and the epitaxial layer 232, as formed, is of N type conductivity.

Adjacent to the interface 202 and in the substrate 230 is a localized region or buried pocket 216 which contains opposite type conductivity modifiers to a relatively high degree. As shown in FIG. 3(a), the buried pocket 216 extends somewhat beyond the interface 202 into the epitaxial layer 232.

The additional elements shown in FIG. 3(a) are as follows. First, there are generally conventional P+ type isolation regions 214 which divide the epitaxial layer 232 into separate islands 212, 242. Finally, a contact region 218 is provided adjacent to the surface 234 of the epitaxial layer 232 and above the buried pocket 216 to permit electrical contact with a metalized conductor (not shown) on the surface 234 of the integrated circuit. The contact region 218 contains the same opposite type conductivity modifiers as the buried pocket 216.

The pocket capacitor is formed by the electrical field 220—220' which is developed at the interface, or junction, of the buried pocket 216 and the P+ type isolation region 214. One terminal of the capacitor is located at the surface 234 of the contact region 218, while the other terminal is coupled to ground due to the conventional grounding of the substrate 230.

Since the carrier density of the P+ type isolation region 124 at the interface with the buried pocket 216 is relatively low, the density of the electrical field 220—220' across the pocket junction is also low, resulting in a relatively high breakdown potential of 8-10 volts for the capacitor. The capacitor is thus capable of sustaining the maximum video signal potential of approximately 9 volts across its terminals without breaking down.

However, the low carrier density of the P+ isolation region 214 also causes the capacitor to have a relatively low capacitance per unit area of the integrated circuit, the nominal value being 0.4 picofarads per square mil. Thus, pocket capacitors usually require larger chip areas, or are restricted to low value capacitors. Moreover, the non-uniform carrier concentration of the P+ isolation region 214 at the interface with the buried pocket 216 and the relatively small difference in carrier density between the buried pocket 216 and the P+ isolation region 214 makes the field density of electrical field 220—220' difficult to control from chip to chip. As a result of these factors, pocket capacitor tolerances can generally be maintained in large lot manufacture to only ±40%.

A cross sectional view of a typical N+P+ integrated circuit capacitor is illustrated in FIG. 3(b). As in the case of the pocket capacitor, the N+P+ capacitor is formed on a body 210 of semiconductor material, including a substrate 230 and an epitaxial layer 232. The capacitor is located on an island 252 in the epitaxial layer 232 which is bounded by P+ isolation regions 214. A high carrier density P+ type region 222 is provided adjacent to the surface 234 of the epitaxial layer 232 and a high carrier density N+ region 224 is located within the P+ type region 222, also adjacent to the surface 234 of the epitaxial layer 232.

The N+P+ capacitor is formed by the electrical field 226—226' which is developed at the junction of the N+ region 224 and the P+ region 222. One terminal of the capacitor is located at the surface 234 of the N+ region 224, while the other terminal is located at the junction of the P+ region 222 with the surface 230 of the epitaxial layer 232 on either side of the N+ region 224.

Due to the high carrier densities of the opposite conductivity type N+ and P+ regions 224 and 222, the density of the electrical field 226—226' across the junction of the two regions is relatively high. This results in a relatively low practical breakdown potential of approximately 4 volts (5.5 volts with leakage) for the N+P+ capacitor. Thus, the N+P+ capacitor cannot sustain the full video signal potential of 9 volts relative to ground without breaking down.

However, the N+P+ provides other operational advantages. The high carrier densities of the N+ and P+ regions 224 and 222 result in a high capacitance per unit area of integrated circuit of approximately 1.2 picofarads per square mil. Moreover, since the two regions are in direct contact with each other in an area which is closest the surface of the chip and have large, opposite carrier densities, the tolerance of the capacitor can be maintained in large lot manufacture to ±10%.

The distinctive features of the pocket and N+P+ capacitors are advantageously used in the active filter 50 of FIG. 1. Known configurations, such as the delay line described in U.S. Pat. No. 3,624,288, use an R-C delay line having capacitors coupled from the signal path to ground to form the lowpass filter area pocket capacitors, or MOS capacitors. Thus, these delay networks use large areas of the integrated circuit. The present invention, however, uses a pocket capacitor for capacitor 48, and an N+P+ capacitor for feedback capacitor 46. Resistor 44 and pocket capacitor 48 comprise a first lowpass filter capable of withstanding the maximum video signal potantial of 9 volts relative to ground without breaking down. Resistor 42 and N+P+ capacitor 46 comprise a second lowpass filter with a breakdown potential of only 4 volts, but the capacitor 46 is coupled between two points in the signal path. It is seen from FIG. 1 that the signal at the emitter of transistor 138 is identical to that at the junction of resistors 42 and 44, delayed only by the first lowpass filter and transistors 132 and 138. This arrangement ensures that the breakdown potential of capacitor 46 is not exceeded for any significant period of time.

FIGS. 4(a) and 4(b) illustrate how the active filter 50 utilizes the high area capacitance of the N+P+ capacitor to its best advantage. FIG. 4(a) is a surface view of the pocket capacitor of FIG. 3(a), while FIG. 4(b) is a surface illustration of the N+P+ capacitor of FIG. 3(b). These FIGURES show that the buried pocket 216 of the pocket capacitor in FIG. 4(a) occupies approximately the same area as the epitaxial layer island 252 of the N+P+ capacitor in FIG. 4(b). The N+P+ capacitor 46, however, has three times the capacitance of the pocket capacitor 48 (30 picofarads vs. 10 picofarads in the example shown). Therefore, the lowpass filter 42, 46 which uses the N+P+ feedback capacitor provides a significantly greater delay in active filter 50 than the lowpass filter 44, 48 which utilizes the pocket capacitor, although their respective capacitor (and resistor) integrated circuit chip areas are equal. Moreover, the N+P+ capacitor has the additional advantage of better capacitance value tolerance, as previously explained.

The erroneous operating condition known as "sidelock" has been discussed previously. A video signal condition which may cause sidelock is illustrated in FIG. 9. A large amplitude video signal 306, which can result from the sudden reception of a strong video signal before AGC control is completed, is shown in the FIGURE. Video signal 306 has a front porch 315 and a back porch 317 at a 2.5 volt level, which is the sync tip level of the normal video signal illustrated in FIG. 5. The tip of the horizontal sync pulse 316 in the video signal 306 is at a 0.5 volt level, which exceeds the 1.3 volt threshold 310 of the noise inverter 30. The noise inverter 30 of FIG. 1 will detect the threshold crossing at time $T_1$ in FIG. 9, and transistor 210 will generate an inverted sync pulse 318. Broken waveform 308 in FIG. 9 represents the delayed composite video signal coupled by the active filter delay to connection point 60. The inverted sync pulse 318 will cancel the sync pulse in waveform 308 at the connection point 60.

The result of this cancellation is illustrated in FIG. 10. The waveform there illustrated represents the signal which is coupled to the sync separator 40 from the emitter of transistor 138. It can be seen that the waveform contains two pulses 312 and 314, which were the front and back porches 315 and 317 of the original video signal, respectively. The sync separator will respond to pulses 312 and 314 by generating two sync pulses, which will result in the sidelock condition previously described.

The sidelock condition can be prevented by the use of the modified noise inverter 30 which is illustrated in FIG. 2. The reference numerals of the noise inverter 30, the $V_{be}$ supply 80 and the active filter delay 50 of FIG. 1 have been retained in FIG. 2, and these elements require no further discussion.

In FIG. 2, the base of differential amplifier transistor 104 is coupled to ground by a resistor 178 and to the emitter of a transistor 180 and the collector of a transistor 162. Transistor 180 has its collector coupled to ground and its base coupled to the junction of resistor 118 and the emitter of transistor 108 of the $V_{be}$ supply 80. Resistor 126 of the $V_{be}$ supply 80, shown in FIG. 1, has been replaced in FIG. 2 with the serial connection of resistors 166, 168 and 172 between the base of transistor 108 and the +B supply. The base of the current source transistor 106 is coupled to the one $V_{be}$ point of the $V_{be}$ supply 80 by a decoupling resistor 176.

The emitter of transistor 162 is coupled to the emitter of a matched transistor 164 to form a comparator 160. Emitter current for the comparator 160 is provided by a constant current source transistor 170, which has its base coupled to the junction of resistors 168 and 172, its collector coupled to the +B supply, and its emitter coupled to the emitters of transistors 162 and 164 by a resistor 174. The base of transistor 162 is coupled to a point of reference voltage at the junction of resistors 166 and 168. The collector of transistor 164 is coupled to ground, and the base of transistor 164 is coupled to the output of the active filter 50 at the emitter of transistor 138.

Comparator 160 prevents sidelock by sensing the voltage level of the delayed composite video signal at the output of the active filter delay 50 and disabling the noise inverter by grounding the base of transistor 104 whenever the video signal level exceeds the reference level at the base of transistor 162. Resistors 172, 168 and 166 and $V_{be}$ supply 80 comprise a voltage divider which maintains the base of transistor 162 at a constant reference level of 4.1 volts in the example illustrated in FIG. 2. As long as the level of the composite video signal at the base of transistor 164 is above this level, transistor 164 is turned off and transistor 162 conducts current to the base of transistor 104. The voltage at the base of transistor 104 is clamped at 1.3 volts when transistor 162 is conducting current due to the two $V_{be}$ drops of transistors 180 and 110. Under these conditions, the noise inverter 30 will operate with a 1.3 volt noise threshold level as described in the discussion of FIG. 1.

When the level of the video signal at the output of the active filter 50 exceeds the 4.1 volt comparator reference level as the video signal approaches the noise inverter threshold level, transistor 164 will turn on and transistor 162 will turn off. Transistor 162 will thus conduct no current to the base of transistor 104, which is held at ground potential by resistor 178. Resistor 178 also discharges the parasitic capacitances in the noise inverter 30 and the $V_{be}$ supply 80 to ground. Since all video and noise signals are clipped near ground potential by the video amplifier 4, the noise inverter 30 is disabled by the application of a ground threshold level at the base of transistor 104. Therefore, the noise inverter 30 will be unable to invert sync pulses which drop below the nominal nose inverter threshold of 1.3 volts, preventing sidelock.

This operation of the comparator 160 is illustrated by the waveforms shown in FIGS. 11 and 12. FIG. 11 illustrates a normal video signal 332 at the output of the active filter 50. Since the video signal 332 is continuously above the comparator reference level 330 except for the sync pulse, the noise inverter 30 will continuously cancel impulse noise at the 1.3 volt threshold except for the sync pulse duration. However, it should be noted that noise occurring during the sync pulse will not falsely trigger the sync separator 40, since the sync separator 40 will be generating a sync pulse at this time.

FIG. 12 illustrates a strong video signal 334 which exceeds the noise inverter threshold 310 at the input to the noise inverter 30. Broken waveform 336 represents the delayed video signal at the output of the active filter 50. Although the input video signal 334 exceeds the noise inverter threshold 310 at time $T_2$, which would otherwise cancel sync pulse 338 as described in the discussion of FIG. 9, the transition of the output video signal 336 below the comparator reference level 330 at time $T_1$ operates to disable the noise inverter 30 by changing the noise inverter threshold to ground level. Thus, the noise inverter 30 is unable to cancel the sync pulse 338, which is coupled to the sync separator 40 for proper peak detection and separation.

Although the noise inverter is disabled from time $T_1$ to time $T_3$ in FIG. 12, impulse noise occurring during this period will not cause problems in the television receiver. Since waveform 334 is at a higher than normal signal level, correction by the AGC system is required to return the signal to nominal levels. By deriving an AGC keying signal from the sync separator pulses, the AGC system can take advantage of noise generated sync pulses by sampling the level of the impulse noise. Since the impulse noise occurs in a negative-going direction, AGC control based on the level of these signals is in a direction which would reduce the gain of the television receiver circuits. Thus, the noise generated sync pulses may actually increase the speed of the AGC system so as to more quickly return the video signal to normal signal levels. Moreover, if a coincidence circuit is used to key the AGC system upon the coincidence of both a sync pulse and a horizontal retrace pulse, as described in my copending U.S. patent application Ser. No. 934,835, entitled "AGC Keying Signal Circuit," false sync pulses occurring at a time other than during the horizontal retrace pulse interval will be ignored for AGC keying purposes.

Finally, it should be pointed out that impulse noise in a nominal level video signal, such as waveform 340 in FIG. 6, will not change the noise inverter threshold level as it drops below the comparator reference level. This is because the comparator 160 senses the level of video signal at the output of the active filter 50, in which the impulse noise has been cancelled. As waveform 350 in FIG. 7 illustrates, the cancelled noise pulse 352 will not fall below the 4.1 volt comparator reference level. Moreover, even if the narrow spike on the leading edge of the cancelled noise pulse 352 drops below the 4.1 volt reference level, the stretching effect of active filter capacitors 46 and 48 will continue to cancel the impulse noise, and the cancelled noise pulse 352 at the base of transistor 164 will quickly rise above the 4.1 volt reference level, continuing the noise cancellation.

What is claimed is:

1. A noise cancellation circuit for cancelling impulse noise in a composite video signal comprising:
   a source of composite video signals which may be contaminated with impulse noise;
   noise inverting means coupled to said source of composite video signals for inverting impulse noise in said composite video signals which exceeds a predetermined threshold level;
   a resistive signal path having an input terminal coupled to said source of composite video signals and an output terminal;
   amplifying means having an input terminal coupled to the output of said noise inverting means and to the output terminal of said resistive signal path, and having an output terminal for producing a substantially noise-free composite video signal;
   a feedback capacitor having a first terminal coupled to said resistive signal path at a first point remote from said input terminal of said resistive signal path, and having a second terminal coupled to the output terminal of said amplifying means,
   wherein said resistive signal path, said feedback capacitor and said amplifying means comprise an active filter.

2. The noise cancellation circuit of claim 1, wherein said active filter further comprises:
   a second capacitor having a first terminal coupled to said resistive signal path at a second point remote from said input terminal of said resistive signal path, and having a second terminal coupled to a source of reference potential.

3. The noise cancellation circuit of claim 1, wherein:
   said active filter delays the transmission of said composite video signals between the input terminal and the output terminal of said resistive signal path; and
   said active filter delays the termination of the inverted noise pulses produced by said noise inverting means.

4. The noise cancellation circuit of claim 1, wherein:
   said feedback capacitor comprises a semiconductor substrate of one type conductivity having a substantially planar surface, a first localized region of said one type conductivity in said substrate adjacent to said surface and containing one type conductivity modifiers, and a second localized region of opposite type conductivity in said first localized region adjacent to said surface and containing opposite type conductivity modifiers.

5. The noise cancellation circuit of claim 2, wherein:
   said second capacitor comprises a semiconductor substrate of one type conductivity and an epitaxial layer of opposite type conductivity with an interface therebetween, said epitaxial layer having a substantially planar surface, a first localized region of opposite type conductivity in said substrate adjacent to said interface and containing opposite type conductivity modifiers, and a second localized region of said one type conductivity in said epitaxial layer between said planar surface and said first localized region; and
   said feedback capacitor comprises a semiconductor substrate of one type conductivity having a substantially planar surface, a first localized region of said one type conductivity in said substrate adjacent to said surface and containing one type conductivity modifiers, and a second localized region of opposite type conductivity in said first localized region adjacent to said surface and containing opposite type conductivity modifiers.

6. In a noise cancellation circuit, a noise inverting circuit for inverting impulse noise in a composite video signal comprising:
   a source of composite video signals which may be contaminated with impulse noise;
   means coupled to said source of composite video signals for combining inverted noise pulses with said composite video signals to develop, at an output, substantially noise-free composite video signals;
   means, having an input coupled to said output, and responsive to said substantially noise-free composite video signals for generating a first reference potential when said substantially noise-free composite video signals exceed a predetermined threshold level, and a second reference potential when said substantially noise-free composite video signals do not exceed said predetermined threshold level; and
   differential amplifier means having a first input terminal coupled to said source of composite video signals, a second input terminal coupled to said reference potential generating means, and an output terminal coupled to said combining means for generating an inverted noise pulse when impulse noise in said composite video signals exceeds the reference potential at said second input terminal.

7. The noise cancellation circuit of claim 6, further comprising a synchronizing signal separating circuit having an input coupled to the output of said combining means for deriving separated synchronizing signals from said substantially noise-free composite video signals.

8. In a noise cancellation circuit, a noise inverting circuit for inverting impulse noise in a composite video signal comprising:
   a source of composite video signals which may be contaminated with impulse noise;
   signal processing means coupled to said source of composite video signals;

means for generating a first reference potential when said processed composite video signals exceed a predetermined threshold level, and a second reference potential when said processed composite video signals do not exceed said predetermined threshold level; and differential amplifier means having a first input terminal coupled to said source of composite video signals, a second input terminal coupled to said reference potential generating means, and an output terminal for generating an inverted noise pulse when impulse noise in said composite video signals exceeds the reference potential at said second input terminal, wherein said signal processing means comprises an active filter having a first input coupled to said source of composite video signals, a second input coupled to the output terminal of said differential amplifier and a resistive signal path disposed between said first and second inputs, non-inverting transistor means having an input electrode coupled to said second input, and an output electrode, and a feedback capacitor coupled from said output electrode to said resistive signal path, wherein said reference potential generating means is coupled to said output electrode of said non-inverting transistor means.

9. A noise cancellation circuit for cancelling impulse noise in a composite video signal comprising:

a source of composite video signals which may be contaminated with impulse noise;

means coupled to said source of composite video signals for delaying said signals;

a differential amplifier having a first input coupled to said source of composite video signals and a second input responsive to a threshold for generating an inverted noise signal whenever said composite video signals exceed said threshold;

means for combining said delayed composite video signals with said inverted noise signal to produce, at an output, noise cancelled composite video signals;

a synchronizing signal separator circuit having an input coupled to the output of said combining means;

a comparator having a first input coupled to the input of said synchronizing signal separator circuit and a second input coupled to a predetermined voltage level for generating a first reference potential when said noise cancelled composite video signals exceed said predetermined voltage level, and a second reference potential when said noise cancelled composite video signals do not exceed said predetermined voltage level; and means for coupling said first and second reference potentials to the second input of said differential amplifier.

* * * * *